Nov. 2, 1943.     W. T. DUNN     2,333,161

POWER TRANSMITTING MECHANISM

Filed Jan. 17, 1941

INVENTOR
*William T. Dunn.*
BY
*Harness, Dickey, Pierce & Harris*
ATTORNEYS

Patented Nov. 2, 1943

2,333,161

UNITED STATES PATENT OFFICE 2,333,161

POWER TRANSMITTING MECHANISM

William T. Dunn, Detroit, Mich., assignor to Chrysler Corporation, Highland Park, Mich., a corporation of Delaware Application January 17, 1941, Serial No. 374,814

13 Claims. (Cl. 184—6)

This invention relates to power transmissions of the type especially adapted for motor vehicles and refers more particularly to the supplying of lubricant thereto although the invention in its broader aspects may be utilized in connection with mechanisms of a similar nature wherein a supply of fluid is essential to operation thereof.

The invention is illustrated and described in connection with a power transmitting mechanism including driving and driven structures, such as shafts for example, and means for establishing a plurality of speed ratio drives between these structures whereby the latter may be selectively operated at substantially the same speed of rotation or at speeds of rotation which differ one from the other. Mechanism of the foregoing type includes relatively movable parts and requires a supply of lubricant for operation thereof.

An object of the invention is the provision in a mechanism of the foregoing type of improved means for supplying lubricant thereto.

Another object of the invention is to provide improved means of this type which insure a lubricant supply which has a direct relationship to the difference in speeds of operation of the driving and driven structures. More particularly an object of the invention is to insure an adequate supply of lubricant when these structures are subject to relative rotation.

A still further object of the invention is the provision of lubricant supply means which is characterized by simplicity of construction and efficiency of operation and to so construct and arrange this supply means with respect to the mechanism as to permit the installation thereof in a relatively small space.

Other objects and advantages of the invention will be more apparent from the following description taken in connection with the accompanying drawing, in which.

Figure 1:
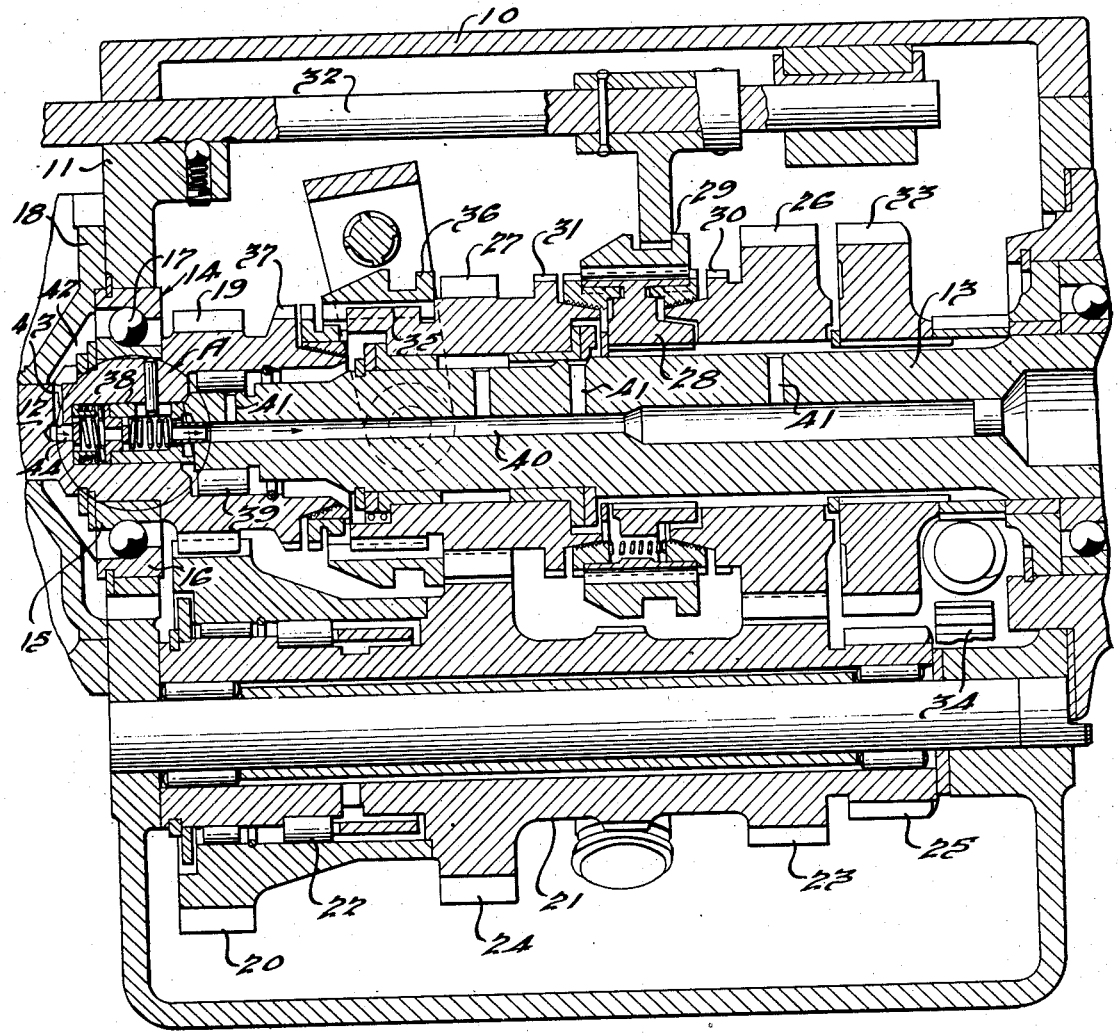
Fig. 1 is a longitudinal sectional elevational view through a power transmission embodying the invention.

Referring to the drawing, the power transmission mechanism is enclosed in a housing 10, including a forwardly disposed wall 11, which serves as a lubricant reservoir. Drive from any suitable source, such as an internal combustion engine (not shown) is transmitted to the driving shaft 12, thence through the speed ratio gearing to the output shaft 13. The wall 11 has an opening therein receiving the bearing unit, indicated at 14, which journals the shaft 12, this unit including the inner and outer race members 15 and 16, respectively, having a plurality of balls 17 disposed therebetween. The wall opening is closed by a member 18 within which the shaft 12 rotates.

The shaft 12 carries the main drive pinion 19 which is in constant mesh with gear 20 which drives the countershaft 21 through an overrunning clutch 22 of the usual type such that when shaft 12 drives in its usual clockwise direction (looking from front to rear) the clutch 22 will engage to lock the gear 20 to countershaft 21 whenever the gear 20 tends to drive faster than the countershaft. However, whenever the gear 20 tends to rotate slower than the countershaft then the clutch 22 will automatically release whereby the shaft 12, under certain conditions, may readily drop its speed while the countershaft 21 continues to revolve.

The countershaft 21 comprises cluster gears 23, 24 and 25 which respectively provide drives in first, third and reverse. Freely rotatable on shaft 13 are the first and third driven gears 26 and 27 respectively in constant mesh with countershaft gears 23 and 24. A hub 28 is splined on the shaft 13 and carries therewith a shiftable sleeve 29 adapted to shift from the Fig. 1 neutral position either rearwardly to clutch with the teeth 30 of the gear 26 or else forwardly to clutch with the teeth 31 of gear 27. The sleeve 29 is operably connected to a shift rail 32 adapted for operation by any suitable means under shifting control of the vehicle driver.

The shaft 13 carries a reverse driven gear 33 fixed thereto, and a reverse idler gear 34 is shiftably mounted for meshing with gears 25 and 33 to provide the reverse drive.

In operation of the mechanism, the first speed ratio drive is obtained by shifting the sleeve 29 to clutch with the teeth 30, the drive passing from shaft 12 to pinion 19 thence through gear 20 and clutch 22 to countershaft 21 and from the latter through gears 23, 26 and sleeve 29 to the output shaft 13. The third speed ratio drive is obtained by shifting the sleeve 29 to clutch with the teeth 31, the drive passing to the countershaft 21 as before and thence through the gears 24, 27 and sleeve 29 to the shaft 13. The reverse speed ratio drive is obtained by shifting the idler gear 34 into mesh with the gears 25, 33, sleeve 29 being in neutral, the drive passing to the countershaft 21 as before and thence through gears 25, 34 to the shaft 12.

Slidably splined on teeth 35 carried by the gear 27 is a second clutch sleeve 36 which is adapted to shift forwardly to clutch with teeth 37 carried by the pinion 19 thereby positively clutching the shaft 12 directly to the gear 27. The sleeve 36 is adapted to step-up the speed ratio drive from first to second and from third to fourth, the latter being a direct drive speed ratio. The sleeve 36 can be shifted by suitable means (not shown) the details of which are not material to the invention herein.

In the further operation of the mechanism, when the latter is operating in first, second is obtained by shift of the sleeve 36 to clutch with the teeth 37, resulting in a two-way drive for second as follows: pinion 19 through sleeve 36 to gear 27 thence through gears 24, 23 and 26 to sleeve 29 and shaft 13, the clutch 22 overrunning. When driving in third, fourth or direct is obtained as for second, there being a two-way drive as follows: pinion 19 through sleeve 36 to gear 27 thence directly through the sleeve 29 to the shaft 13, the clutch 22 overrunning as before.

It will therefore be apparent that a plurality of speed ratio drives are provided, including a direct drive, during operation of which the shafts are rotated at the same speed, and other drives during operation of which the speed of rotation of the shaft 12 exceeds the speed of rotation of the shaft 13.

The shaft 12 has a central bore providing a chamber indicated at 38 and a communicating counterbore receiving the forward end portion of the shaft 13, the latter being journalled therein by roller bearings 39. The shaft 13 has an axially extending passage 40, coaxial with the chamber 38, and a plurality of radially extending passages 41 communicating therewith and with the various gears means heretofore described whereby lubricant can be supplied to the same, together with the bearing 39. The casing 10 constitutes a lubricant reservoir. The relatively high rotative speed of the countershaft gearing tends to displace lubricant such as to produce and maintain a supply thereof adjacent the wall 11 of the casing. Lubricant passes between the inner and outer races of the bearing unit 14 to the space indicated at 42 provided by the cap 18, thence through the radial and axial passages 43 and 44, respectively, for admission to the chamber 38.

Admission of lubricant from the passage 44 to the chamber 38 is controlled by a valve 45 urged to its illustrated closing position by a spring 46 acting against the head 47 of a piston 48 slidable within the chamber 38. The valve 45 is axially guided by the member 49 which is maintained in the illustrated position by a spring 50 also acting against the piston head 47. A plurality of circumferentially spaced fingers 51 accommodate passage of lubricant to the chamber when the valve is unseated, such unseating occurring through the action of vacuum induced in the chamber in response to movement of the piston 48 in a direction away from the valve 45. When the piston 48 is moved in a direction toward the valve 45 against the opposition of the spring 46 the valve 45 is thereby closed, and, the quantity of lubricant previously admitted to the chamber 38 between the valve 45 and piston head 47, under the influence of the piston, moves a valve 52, similar to the valve 45, to its open position. When the valve 52 is opened, lubricant passes through the opening 53 in the piston head 47 and through the piston into the outlet tube 54 carried by the shaft 13 and communicating with the passage 40 in the latter. The valve 52 is biased to closed position by a spring 55, the valve 52 closing under the influence of the spring 55 immediately upon release of the quantity lubricant previously admitted upon opening of the valve 45 as aforesaid.

Figure 2:
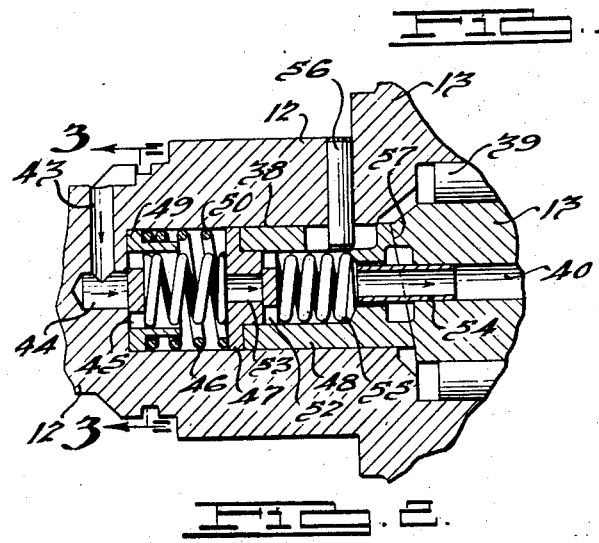
Fig. 2 is an enlarged sectional elevational view of that portion of Fig. 1 included in the circle indicated at A.
Figure 3:
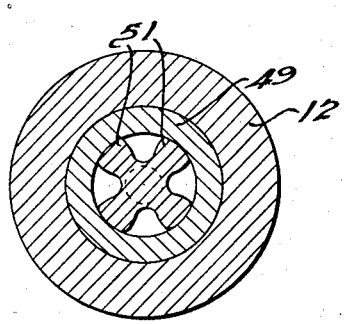
Fig. 3 is a sectional view taken on the line 3—3 of Fig. 2.

The piston 48 is secured to the shaft 12 for rotation therewith by a pin 56, the piston having a slot receiving the latter and accommodating reciprocable movement of the piston. In order to effect this movement the piston and shaft 13 have abutting oppositely inclined end faces as indicated at 57, providing cooperating cam surfaces, the latter operable to move the piston to the left, as viewed in Figs. 1 and 2, in response to relative rotation of the shafts, that is when the shaft 13 is rotated with the transmission in neutral and when the speed of rotation of the shaft 12 exceeds the speed of rotation of the shaft 13 when the transmission is under operating control of one of the aforementioned speed ratio drives other than the direct drive. Movement of the piston 48 in the opposite direction is under influence of the spring 50. When the transmission is operating in direct drive, as aforesaid, the shafts 12 and 13 are rotating at the same speed and the piston 48 is not subjected to normal reciprocal movement.

It will be noted that the supply of lubricant to the relatively movable parts respectively associated with the shafts bears a definite relationship to the operation of the latter such that, for example, the supply of lubricant delivered to the transmission is proportionate to the difference in the speeds of rotation of the shafts 12 and 13, it being understood that the supply of lubricant should be greater when the shaft and gear means respectively associated therewith are subject to relative rotation than when the latter are rotating as a unit. The lubricant supply pump is so located as to take advantage of the supply of lubricant maintained adjacent the wall 11 by the relatively high speed rotation of the countershaft gearing, a supply of lubricant being kept at the pump inlet thereby minimizing the requirement of lift by the pump.

I claim:

1. In a power transmitting mechanism including a fluid reservoir and driving and driven shafts, one of said shafts having a chamber therein in fluid communication with said reservoir and the other of said shafts having a fluid passage therein in fluid communication with said chamber and said mechanism, a piston rotatable with said one of said shafts and adapted for reciprocal movement in said chamber, valving means operable incident to reciprocal movement of said piston to control communication of fluid through said chamber, and means responsive to relative rotation of said shafts for effecting reciprocal movement of said piston.

2. In a power transmitting mechanism including a fluid reservoir and driving and driven shafts, one of said shafts having a chamber therein in fluid communication with said reservoir and the other of said shafts having a fluid passage therein in fluid communication with said chamber and said mechanism, a piston rotatable with said one of said shafts and adapted for reciprocal movement in said chamber, valving means operable incident to reciprocal movement of said piston to control communication of fluid through said chamber, said valving means including a first valve operable to accommodate the admission of fluid to said chamber upon movement of said piston in one direction and a second valve operable to accommodate the discharge of fluid from said chamber upon movement of said piston in the other direction.

3. In a power transmitting mechanism including a fluid reservoir and driving and driven shafts, one of said shafts having a chamber therein in fluid communication with said reservoir and the other of said shafts having a fluid passage therein in fluid communication with said chamber and said mechanism, a piston rotatable with said one of said shafts and adapted for reciprocal movement in said chamber, valving means operable incident to reciprocal movement of said piston to control communication of fluid through said chamber, and cooperating cam means respectively carried by said piston and said other shaft operable to effect reciprocal movement of said piston in response to relative rotation of said shafts.

4. In a power transmitting mechanism including a fluid reservoir and driving and driven shafts, one of said shafts having a chamber therein in fluid communication with said reservoir and the other of said shafts having a fluid passage therein in fluid communication with said mechanism, a piston rotatable with said one of said shafts and adapted for reciprocal movement in said chamber, said piston having an opening therein accommodating passage of fluid from said chamber to said passage, valving means operable incident to reciprocal movement of said piston to control communication of fluid between said reservoir and said passage, said valve means including a first valve operable incident to movement of said piston in one direction to accommodate the admission of fluid to said chamber, a spring in said chamber yieldably opposing said valve operation, a second valve operable incident to movement of said piston in another direction to accommodate the discharge of fluid from said chamber through said piston, a spring in said piston opening yieldingly opposing said operation of said second valve, cooperating cam faces respectively carried by said piston and said other shaft operable to effect reciprocal movement of said piston in response to relative rotation of said shafts, and spring means acting on said piston for urging said cam faces one toward the other.

5. In a power transmitting mechanism including coaxial driving and driven shafts, speed ratio drive means for drivingly connecting said shafts including a first means operable to effect rotation of said shafts at substantially the same speed and a second means operable to effect rotation of said driven shaft at a speed different from the speed of rotation of said driving shaft, a pump for supplying lubricant to said mechanism including a reciprocable pumping piston rotatable with one of said shafts, and piston reciprocating means rotatable with the other of said shafts for reciprocating said piston only when said driven shaft is rotated under control of said second means.

6. In a power transmitting mechanism including aligned torque input and output shafts, a first speed ratio drive means operable to effect rotation of said shafts at approximately the same speed and a second speed ratio drive means operable to effect rotation of one of said shafts at a speed different from the speed of rotation of the other of said shafts, a force feed lubricant pump embodied in said input shaft including a reciprocal piston rotatable with and at the same speed as said input shaft, and cam means rotatable with and at the same speed as said output shaft operable to reciprocate said piston when said shafts are rotating at relatively different speeds.

7. In a power transmitting mechanism including driving and driven shafts, a first speed ratio drive means operable to effect rotation of said shafts at approximately the same speed and a second speed ratio drive means operable to effect rotation of said shafts at relatively different speeds, a force feed lubricant pump embodied in one of said shafts including a pumping element rotatable with and at the same speed as said one shaft, and means rotatable with and at the same speed as the other of said shafts cooperating with said element to effect pumping action thereof when said shafts are rotating at relatively different speeds.

8. In a power transmitting mechanism including aligned torque input and output shafts, a force feed lubricant pump embodied in said input shaft and including a reciprocal piston rotatable with and at the same speed as said input shaft and having a cammed end face, said output shaft having a cammed end face engaging the cammed end face of said piston and cooperating therewith to effect reciprocation of said piston in response to relative rotation of said shafts.

9. In a power transmitting mechanism including driving and driven shafts, a first speed ratio drive means operable to effect rotation of said shafts at approximately the same speed and a second speed ratio drive means operable to effect rotation of one of said shafts at a speed different from the speed of rotation of the other of said shafts, a pump for supplying lubricant to said mechanism, and drive means for said pump including cooperating engaging surface portions each rotatably driven from and at the same speed as one of said shafts, respectively, such that the speed of rotation of one of said portions varies with respect to the speed of rotation of the other of said surfaces in response to variation in the relative speeds of rotation of said shafts.

10. In a power transmitting mechanism including driving and driven members, a first speed ratio drive means for operating said members at approximately the same speed, a second speed ratio drive means for operating said members at relatively different speeds, and pump means including cooperating pump driving elements respectively driven from and at the same speed as that of said members such that the speed of movement of one of said elements varies with respect to the speed of movement of the other of said elements when said members are operating under control of said second speed ratio drive control means.

11. In a power transmitting mechanism including driving and driven members, a plurality of speed ratio drive means for operating said members at relatively different speeds respectively, and pump means including a reciprocating piston and piston reciprocating means respectively driven from and at the same speed as that of said members, the speed at which said reciprocating means is driven varying with respect to the speed at which said piston is driven in response to variation in the relative speeds of said members under control of said speed ratio drive control means.

12. In a power transmitting mechanism including driving and driven members, one speed ratio drive means for operating said members in a predetermined relative speed relationship, another speed ratio drive means for operating said members such that the relative speeds thereof vary with respect to the relative speed relationship established by said one speed ratio drive means, and a pump including cooperating pump driving parts respectively driven from said members such that the relative speeds of said parts vary proportionately to variation in the relative speeds of said members occasioned by operation of said one and another speed ratio drive means.

13. In a power transmitting mechanism including driving and driven members, one speed ratio drive means for operating said members at approximately the same speed and another speed ratio drive means for operating said members at relatively different speeds, and a pump including cooperating pump driving parts respectively driven from said members such that the relative speeds of said parts vary in response to variation in the relative speeds of said members occasioned by operation of said one and another speed ratio drive means.

WILLIAM T. DUNN.